United States Patent Office 2,730,839
Patented Jan. 17, 1956

2,730,839
METHOD OF POLLINATION

Stephen E. Chaffee, Sunnyside, Wash.

No Drawing. Application September 14, 1954,
Serial No. 456,077

9 Claims. (Cl. 47—58)

The present invention relates generally to the pollination or fecundation of plants, and more particularly to a method for greatly enhancing the degree of seed production in such plants as alfalfa, where the pollen carrying stamen is normally substantially enclosed within a pod, thus presenting a difficult obstacle to pollination.

The seed of alfalfa is produced from a bloom of violet or variegated color. On a single healthy plant there may be from fifty to one hundred blooms and sometimes more, with from ten to twelve floral leaves to every blossom, and a stamen and pistil for each floral leaf, the pistil containing seed germs in numbers which when fertilized by the dust-like pollen on the tip end of the stamen are capable of producing a seed pod containing from six to twelve seeds.

Unlike other animal food plants, however, such for example as clover, the stamen of alfalfa is enclosed in a pod located externally of and branching from the stem of an opposing companion floral leaf confining the stamen until the bloom is ripe. Before the fertilization of any of the germ cells can take place in a ripe bloom, the pod must be forcibly opened sufficiently for the stamen to bend by nature into physical contact with its companion floral leaf with a force adequate to jar the dust-like pollen from its tip or head. In the formation and growth of the alfalfa bloom an overhanging lip covers the top of the stamen. Although alkali bees have been used for pollinating alfalfa blooms with some success, this formation renders the stamen substantially inaccessible to many pollen-carrying insects and pollen-carrying winds, that would otherwise function as agencies of fecundation.

Owing to the fact that the pistil is located at the base of and between the floral leaf and the stamen, the floral leaf, following the contact with the head of the stamen, operates as a deflector tending to direct more or less of the pollen downwardly to make contact with the germ cells in the ovule. Soon thereafter the leaf shrivels up, while the stamen curls itself to form a seed pod confining the fertilized germs until the seeds therefrom are in a ripened state.

It can thus be seen that one of the principal factors in the low production of alfalfa seed is the fact that alfalfa blossoms and flowers do not, under natural conditions, and unaided by such insects as alkali bees, open sufficiently to permit access for fertilization or pollination so that a profitable crop of seed will be produced. Neither the stamen nor its pod inherently possesses any force capable of opening the pod for the escape of the stamen therefrom to contact with the opposing floral leaf. Fecundation takes place only during the ripe stage of the bloom and then only when the pollen pod is tripped or burst open for the enclosed stamen to escape and release the pollen.

In order to increase and/or control the seed yield of alfalfa or the like plants, in accordance with the present invention a method is provided for inducing or causing the stamen pod to open at a desired time, thereby releasing the stamen to distribute its pollen for effective fertilization of the seed germs carried in the ovule of the flower. Basically, the present invention is predicated upon my discovery that by appropriately dusting the alfalfa blooms with a sulfur dust, or a dusting compound containing an appropriate amount of sulfur, the sulfur burns the stamen pod so that it will trip or burst open and release the stamen to distribute its pollen. As is apparent, since only ripe blossoms are capable of undergoing significant fecundation, the plants should be dusted with sulfur during a period when a significant proportion of the blossoms are ripe. Also, it is contemplated by the present invention that the sulfur dusting be effected at successive spaced intervals, in order that successive series of ripening blossoms may be affected, thereby obtaining the maximum yield from a planting.

Since by the present method the mechanism utilized is the partial burning of the bloom, steps should be taken to prevent or minimize burning of the blossom to the point where it is destroyed. Two facets of the present method are directed to this end. First, the amount of sulfur applied should be chosen as to provide the desired degree of burning, but not in such quantity as to burn the blossom to the point of destruction, as will be more fully considered hereinbelow. Second, the sulfur should be applied at a time when the plants are full of sap and vigorous, as by appropriately irrigating the field of planting prior to the sulfur dusting, or dusting after a suitable rainfall, as will be more fully considered hereinbelow.

It is therefore one object of the present invention to provide a simple, efficient, and effective method for facilitating pollination so as to increase the seed yield, in plants such as alfalfa, where the stamen is substantially enclosed in a pod and thus protected from the normal means afforded by nature for inducing plant pollination.

Another object of the present invention is to provide a method for facilitating pollination in plants as aforedescribed, wherein the degree of pollination may be readily controlled.

Another object of the present invention is to provide a method for tripping and/or bursting the stamen pods of plants as aforedescribed, and particularly alfalfa, for releasing the stamen and enabling it to distribute its pollen.

Still another object of the present invention is to provide a method for artificially opening or inducing the opening of the stamen pod in the floral leaf or floret of the alfalfa blossom.

Still another object of the present invention is to provide a method for facilitating the pollination of and hence increasing the seed yield of alfalfa.

Other objects and advantages of the present invention will become apparent to those skilled in the art, from a consideration of the following detailed description of the present invention, exemplifying a preferred practice in applying the teachings of the present invention to alfalfa.

In practicing the present invention, as pointed out above, it is necessary that the burning action of the sulfur be effective to open the stamen pod, but at the same time the plants should be protected against a burning to the degree that the blossoms are destroyed. To this end, when the alfalfa starts to bloom and preferably has come into about 25% bloom, it is ready for a first sulfur dusting. In the twenty-four hour period preceding the sulfur dusting the alfalfa field is given a quick irrigation. In accordance with a preferred practice, the field is provided with rills not more than twenty-four inches apart in ordinary soil (in loose soil, the ditches may be up to thirty-two inches apart). Irrigation water is caused to flow through the rills at a sufficient speed so that it reaches the lower end of the row in three to five hours, and then it is cut down to a smaller stream but sufficient to flow through the entire row for a total period of preferably seven to nine hours, but never longer than twenty-four hours. Preferably in the early morning of the day following this irrigation when the blossoms are wet with dew and full of sap and vigor, the sulfur dust is applied, the dew facilitating the adherence of the sulfur powder to the blooms. It is apparent that the significant aspect of the irrigation step in the process is that the plants be vigorous and full of sap at the time of the sulfur dusting. One cannot define with exactness the amount of irrigation necessary to this end for all conditions of soil and climate. But it is apparent that the amount of irrigation is not critical so long as it fulfills the purposes indicated above of filling the plants with sap and vigor, and the foregoing indication of an appropriate irrigation procedure under average conditions is an adequate guide to those skilled in the art of the amount of irrigation requisite for any particular situation of climate, soil condition, etc.

The sulfur dusting may be effected by a ground duster or airplane, and one may use pure sulfur dust, or a dusting compound sold under the name of Kolodust and containing 84% sulfur, or other commercial sulfur dusting compounds. For the purposes of the first dusting, preferably effected when the plants reach a twenty-five percent bloom, the sulfur dust is preferably applied at a rate of approximately thirty to thirty-five pounds per acre.

In order to obtain a maximum seed yield from the plantings, the above irrigation and sulfur dusting procedure should be repeated periodically as new blooms become ripe. For example, nine to twelve days after the first dusting depending on weather conditions and the blooming of the plants, the above indicated irrigation and sulfur dusting procedure may be repeated, using approximately forty to fifty pounds of dusting sulfur per acre, as a preferable amount. Eight to ten days later, the irrigation and dusting procedure may be repeated again, utilizing preferably in the order of forty to fifty pounds of sulfur per acre. If the plants continue to grow and bloom freely and there is time to ripen the seed before harvesting, the field may again be irrigated and dusted with forty to fifty pounds of sulfur as above. In irrigated fields, water should of course be supplied to keep the plants green as long as it is desired to set the seed and cause it to develop. The water is then taken off and the field dried for harvesting.

It is apparent that the foregoing procedure for practicing the present invention can be effected as well in a sprinkler system of irrigation as in rill irrigation. In the case of non-irrigation farming, the present invention can also be practiced. In the latter event the sulfur is applied, preferably in the morning, following the occurrence of rains or showers at appropriate intervals in the blooming of the plants.

The foregoing specific procedures for practicing the present invention are presented merely by way of example. Basically, the present invention contemplates the application of sulfur dust, or dusting powder containing substantial quantities of sulfur, to plants such as alfalfa, in amounts sufficient for burning the blooms to the degree where the stamen pod trips or bursts open, but not in such quantity as to destroy the blossom, thus freeing the stamen to distribute its pollen. By preparing the plants to be full of sap and vigor at the time of the sulfur dusting, a balance between burning to that extent necessary for tripping the stamen pod and burning to the point of destroying the blossom is facilitated. To this end, singular success may be had by utilizing a quick irrigation in the period preceding the application of sulfur dust, or the sulfur dust may be applied in the period following a significant rain fall. Accordingly it is not intended that the scope of the present invention be limited to the specific procedures herein described, the specific types or amount of irrigation, or the specific quantities and times of application of sulfur dust. As modifications of the procedures and method herein described will be apparent to those skilled in the art, such modifications as are within the spirit and scope of the appended claims are within the contemplation of the present invention.

I claim:

1. A method of facilitating the pollination of alfalfa plants comprising the steps of periodically applying a sulfur dust to the plants in amounts ranging approximately from thirty to fifty pounds of sulfur per acre as successive blooms of the plants ripen, and applying a quick irrigation to the plants in the period preceding each application of sulfur, the sulfur being applied to burn the stamen enclosing pod for thus causing it to open and release the pollen carrying stamen, the irrigation being applied in amounts sufficient to fill the plants with sap and vigor at the time of the sulfur dusting.

2. A method of facilitating the pollination of plants having stamens substantially enclosed in a stamen pod, comprising the steps of periodically applying a sulfur dust to the plants in amounts ranging approximately from thirty to fifty pounds of sulfur per acre as successive blooms of the plants ripen, and applying a quick irrigation to the plants in the period preceding each application of sulfur.

3. A method of facilitating the pollination of alfalfa comprising the steps of periodically applying a dusting sulfur to the plants in amounts ranging approximately from thirty to fifty pounds of sulfur per acre as successive blooms of the plants ripen, said sulfur applications being effected at times when the plants are full of sap and vigor.

4. A method of facilitating the pollination of alfalfa comprising the steps of periodically applying a dusting sulfur to the plants as successive blooms of the plants ripen in amounts sufficient to burn the stamen containing pods to the point of tripping them in ripe blooms to release the stamens but in amounts less than that which cause a significant destruction of the blooms, said sulfur applications being effected at times when the plants are full of sap and vigor.

5. A method of facilitating the pollination of plants having stamens substantially enclosed in a stamen pod, comprising the steps of periodically applying a dusting sulfur to the plants as successive blooms of the plants ripen in amounts sufficient to burn the stamen containing pods to the point of tripping them in ripe blooms to release the stamens but in amounts less than that which causes a significant destruction of the blossoms, said sulfur applications being effected at times when the plants are full of sap and vigor.

6. In a method of tripping the stamen pods in ripe blooms of alfalfa plants to release the stamens for distribution of pollen, the step of applying a sulfur containing dust to the alfalfa plants in amounts sufficient to burn said pods to the point of tripping the same in said ripe blooms to release the stamens, but in amounts less than that which causes a significant destruction of the blossoms, the sulfur application being effected when the plants are full of sap and vigor.

7. In a method of tripping the stamen pods of ripe blooms in plants having stamens substantially enclosed within pods to release the stamens for distribution of pollen, the step of applying a sulfur containing dust to said plants in amounts sufficient to burn said pods to the point of tripping the same in said ripe blooms to release the stamens, but in amounts less than that which causes a significant destruction of the blossoms.

8. In a method of tripping the stamen pods of ripe blooms in plants having stamens substantially enclosed within pods to release the stamens for distribution of pollen, the step of dusting the plants with a dusting compound containing a burning ingredient, said compound being applied in amounts sufficient to burn said pods to the point of tripping the same in said ripe blooms to release the stamens, but in amounts less than that which causes a significant destruction of the blossoms.

9. In a method of artificially opening the stamen pods in the floral leaves or florets of ripe alfalfa blossoms, the burning of the pods of said ripe blossoms by application of dusting sulfur when the blooms are full of sap and vigor causing the stamen pods of said ripe blossoms to trip open, the amount of sulfur applied being insufficient to effect substantial destruction of the florets, thereby facilitating the distribution of pollen and enabling pollen to enter and fertilize the ovule to cause the setting of seed.

References Cited in the file of this patent

UNITED STATES PATENTS 2,685,149     Hvistendahl _____ Aug. 3, 1954

OTHER REFERENCES

McDaniels: Proc. Am. Soc. Hort. Sci. for 1930, published 1931 in vol. 27, pp. 370–373.

Farm Implement News, vol. 74, No. 16, p. 42 (August 25, 1953).